United States Patent [19]

Beijleveld et al.

[11] 4,409,367
[45] Oct. 11, 1983

[54] PROCESS FOR CROSS-LINKING POLYMERS

[75] Inventors: Wilhelmus M. Beijleveld, ZM Olst; Jan D. van Drumpt, ZD Deventer, both of Netherlands

[73] Assignee: Akzona Incorporated, Asheville, N.C.

[21] Appl. No.: 338,172

[22] Filed: Jan. 8, 1982

[30] Foreign Application Priority Data

Jan. 20, 1981 [NL] Netherlands ............ 8100240

[51] Int. Cl.³ .................................... C08F 8/30
[52] U.S. Cl. ................................. 525/277; 525/278; 525/293; 525/296; 525/377; 525/454; 525/474; 525/479; 525/537
[58] Field of Search ............... 525/377, 296, 454, 474, 525/479, 537, 277, 278, 293

[56] References Cited

U.S. PATENT DOCUMENTS 4,052,373 11/1977 Sera et al. ............ 260/117
4,160,077 7/1979 Brooks et al. ........ 525/332

Primary Examiner—Harry Wong, Jr.
Assistant Examiner—Bernard Lipman
Attorney, Agent, or Firm—Francis W. Young; Robert F. Green

[57] ABSTRACT

There is disclosed an improved process for cross-linking polymers by contacting said polymers with a cross-linking agent at an elevated temperature. The improvement comprises using as the cross-linking agent a compound of the formula

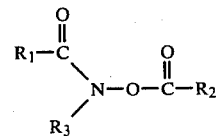

wherein $R_1$ and $R_2$ are independently selected from the group consisting of alkyl groups having 1–22 carbon atoms, alkenyl groups having 2–22 carbon atoms, cyclohexyl groups having 6–20 carbon atoms, phenyl groups having 6–20 carbon atoms, aralkyl groups having 7–20 carbon atoms, alkyloxy groups having 1–22 carbon atoms, alkenyloxy groups having 2–22 carbon atoms, and cyclohexyloxy groups having 6–20 carbon atoms, all of which groups may be substituted or unsubstituted; $R_3$ is selected from the group consisting of hydrogen, alkyl groups having 1–22 carbon atoms, alkenyl groups having 2–22 carbon atoms, cyclohexyl groups having 6–20 carbon atoms, phenyl groups having 6–20 carbon atoms, aralkyl groups having 7–20 carbon atoms, and

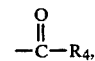

wherein $R_4$ is independently selected from the same group as $R_1$ and $R_2$ as defined above, all of which groups may be substituted or unsubstituted; provided that when $R_3$ is hydrogen, $R_1$ represents an alkyloxy, alkenyloxy or cyclohexyloxy group as defined above.

7 Claims, No Drawings

PROCESS FOR CROSS-LINKING POLYMERS

BACKGROUND OF THE INVENTION

The present invention relates to the cross-linking of polymers by means of a cross-linking agent. For this purpose use is generally made of organic peroxides. The peroxides that are mostly used in actual practice are dicumyl peroxide, di-t-butyl peroxide, bis(t-butylperoxyisopropyl)benzene and 1,1-di-t-butylperoxy-3,3,5-trimethylcyclohexane. A number of hydroxylamines are known from German Patent Application 27 05 034 (a counterpart to U.S. Pat. No. 4,207,091), Archive der Pharmazie 292, 329 (1959) and Liebigs Annalen Chem. 606, 24 (1957) and from the latter publication it is also known that upon being heated, some hydroxyl amines will decompose into radical fragments with which acrylonitrile may be polymerized. The present process, however, relates to the cross-linking of polymers and consequently to a different type of reaction.

SUMMARY OF THE INVENTION

There has now been discovered a new process for cross-linking polymers. The process comprises utilizing as the cross-linking agent a compound I of the formula:

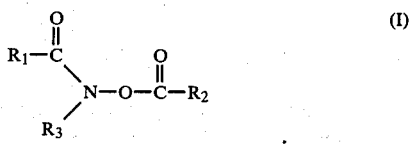

wherein $R_1$ and $R_2$ are independently selected from the group consisting of alkyl groups having 1–22 carbon atoms, alkenyl groups having 2–22 carbon atoms, cyclohexyl groups having 6–20 carbon atoms, phenyl groups having 6–20 carbon atoms, aralkyl groups having 7–20 carbon atoms, alkyloxy groups having 1–22 carbon atoms, alkenyloxy groups having 2–22 carbon atoms, and cyclohexyloxy groups having 6–20 carbon atoms, all of which groups may be substituted or unsubstituted; $R_3$ is selected from the group consisting of hydrogen, alkyl groups having 1–22 carbon atoms, alkenyl groups having 2–22 carbon atoms, cyclohexyl groups having 6–20 carbon atoms, phenyl groups having 6–20 carbon atoms, aralkyl groups having 7–20 carbon atoms, and

wherein $R_4$ is independently selected from the same group as $R_1$ and $R_2$ as defined above, all of which groups may be substituted or unsubstituted; provided that when $R_3$ is hydrogen, $R_1$ represents an alkyloxy, alkenyloxy or cyclohexyloxy group as defined above. The alkyl groups and alkenyl groups may be primary, secondary or tertiary groups.

DETAILED DESCRIPTION OF THE PREFERRED EMBODIMENTS

In the cross-linking agents defined by Formula I above, for $R_1$, $R_2$ and $R_3$ a choice may be made from a large number of different groups. Practically all of the groups may be substituted in one or more positions. Suitable substituents include alkyl groups, cyclohexyl groups, phenyl groups, phenyloxy groups, aralkyl groups, aralkyloxy groups, carboxyl groups, amino groups, nitro groups, and halogen groups. As halogen preferably chlorine is used.

The upper limits of the numbers of carbon atoms for the groups $R_1$, $R_2$ and $R_3$ are governed by only practical considerations.

Examples of polymers which may be cross-linked by the present process include polyethylene, chlorosulphonated polyethylene, chlorinated polyethylene, polybutylene-1, polyisobutylene, ethylene vinyl acetate copolymers, ethylene propylene copolymers, polybutadiene, polyisoprene, polychloroprene, butadiene styrene copolymers, natural rubber, polyacrylate rubber, butadiene acrylonitrile copolymers, acrylonitrile-butadiene-styrene terpolymers, silicone rubber, polyurethanes and polysulphides. The present process is especially beneficial for cross-linking polyethylene.

To the polymer to be cross-linked there is added a sufficient quantity of cross-linking agent to effect cross-linking of the polymer. Generally there is added from about 0.1 to about 10 percent, by weight, preferably from about 1 to about 3 percent, by weight, of the present cross-linking agent. Preferably co-agents such as triallyl cyanurate, trimethylol propane, trimethyl acrylate or low-molecular weight polybutadienes are also employed in an effective amount. Triallyl cyannurate is an especially good co-agent. The co-agents may be added in an amount from about 0.5 to about 5.0 percent, by weight.

The cross-linking reaction is generally carried out at a temperature sufficiently high to cause the cross-linking of the polymer, typically in the range from about 150° C. to about 300° C.

The cross-linking reactions may be carried out under normal cross-linking conditions employing the usual techniques and in an appropriate apparatus.

A particular advantage of the cross-linking reactions in which the present hydroxylamines are used is that the reactions may be carried out at a higher temperature than is generally possible when use is made of organic peroxides. An increase in the reaction temperature leads to a higher permissible processing temperature without attendant scorching (premature vulcanization) and, hence, indirectly to a lower viscosity and improved processability of the polymer to be cross-linked.

Very suitable for use as a cross-linking agent in the present process are the hydroxylamines having the general formula of compound I wherein $R_1$ is an alkoxy group having 1–22 carbon atoms; $R_2$ is an alkoxy group having 1–22 carbon atoms or a phenyl group, and $R_3$ is hydrogen. Examples of such compounds include N-carbethoxy-O-benzoyl hydroxylamine and N,O-dicarbethoxy hydroxylamine.

Another very suitable class of compounds for use in the present process are hydroxylamines having the general formula of compound I wherein $R_1$ is an alkyl group having 1–22 carbon atoms, an alkoxy group having 1–22 carbon atoms, or a phenyl group; $R_2$ is a group indicated for $R_1$; and $R_3$ is an alkyl group having 1–22 carbon atoms or a phenyl group. Examples of compounds in this class include N,O-dibenzoyl-N-methyl hydroxylamine, N,O-dibenzoyl-N-phenyl hydroxylamine, N,O-diacetyl-N-phenyl hydroxylamine, N,O-dilauryl-N-methyl hydroxylamine, N,O-lauroyl-O-benzoyl-N-ethyl hydroxylamine, N-carbethoxy-O-benzoyl-N-methyl hydroxylamine and N,O-dicarbethoxy-N-methyl hydroxylamine.

Another very suitable class of compounds for use in the present process are hydroxylamines having the general formula of compound I wherein $R_1$ is an alkyl group having 1-22 carbon atoms, an alkoxy group having 1-22 carbon atoms, or a phenyl group; $R_2$ is a group indicated for $R_1$; and $R_3$ is one of the aforementioned $R_1$ groups, linked to the nitrogen atom by a carbonyl group, thus having the formula

Examples of compounds in this class include N,N,O-triacetyl hydroxylamine, N,N,O-tribenzoyl hydroxylamine, N,O-dibenzoyl-N-carbethoxy hydroxylamine, N-benzoyl-N,O-dicarbethoxy hydroxylamine, N,N-dicarbethoxy-O-benzoyl hydroxylamine and N,N,O-tricarbethoxy hydroxylamine.

Alternatively, it is possible, of course, to use mixtures of the above-described hydroxylamines. The present compounds may be prepared in a known manner by causing a hydroxylamine to react with acylating agents such as acid chlorides, chloroformates or anhydrides. Instead of employing hydroxylamines use may be made, optionally, of mono- or diacyl hydroxylamines. For the preparation of the present hydroxylamines reference is made to Archive der Pharmazie 292, 329 (1959). The following non-limiting examples serve to further illustrate the present invention.

EXAMPLES 100 grams of low-density polyethylene (type A: Lupolen TM 1810 H from BASF; type B: Alkathene TM 025030 from ICI) were mixed on a roll mill for 3 minutes at 120° C. with 5 millimoles of cross-linking agent and 1 gram of triallyl cyanurate and subsequently cooled and granulated at room temperature.

The cross-linking behavior of the mixture was determined in a Monsanto Rheometer. The procedure then used consists in that in a heated press an oscillating disk (micro die; 5° osc., 1.7 Hz) is embedded in the mixture to be cross-linked, which is heated to a temperature in the range of 200° to 230° C. During cross-linking the torque on the disk is recorded as a function of time. From the curve there was obtained the $t_{90}$ (min) and the $\Delta$ torque ($\Delta$torque=$M_H$-$M_L$; $M_H$=maximum torque, $M_L$=minimum torque) (Nm). These parameters are a measure respectively of the decomposition rate and the efficiency of the cross-linking agent used. This standard test method is described in, inter alia, ASTM D-2084-79, BS 1673(10) 1977 and ISO 3417 (1977).

Moreover, of a number of mixtures that had been cross-linked in a hot press at the above-indicated temperature and time, the gel fraction of the cross-linked material was determined by the extraction method. This method was carried out in boiling xylene and is described in the standards issued under the designations BS 5468-1977 and ANSI/ASTM D2765-68 (1972). The gel fraction (in %) denotes the percentage of the cross-linked polymer which does not dissolve under the test conditions. This parameter is a measure of the degree of cross-linking of the polymer and consequently of the efficiency of the cross-linking agent. Moreover, two control experiments were carried out (with the A type polyethylene and the B type polyethylene). The results are listed in the following Table.

The results in the Table show that the hydroxylamines tested act as cross-linking agents at a relatively high temperature. A number of them display an insufficient cross-linking effect within a reasonable time even at 220°-230° C. and that in order to obtain the desired results the reaction temperature need be increased to, say, 270° C. (see the gel fraction tests).

TABLE I

| | Rheometer test | | | | Extraction test | | | |
| COMPOUND | polymer type | temp. (°C.) | $t_{90}$ (min) | $\Delta$ torque (Nm) | polymer type | cure temp. (°C.) | cure time (min) | gel fraction (%) |
| --- | --- | --- | --- | --- | --- | --- | --- | --- |
| N—carbethoxy-O—benzoyl hydroxylamine | B | 220 | 27.9 | 1.95 | B | 220 | 30 | 75 |
| N,O—dicarbethoxy hydroxylamine | A | 200 | >60 | >0.14 | A | 270 | 30 | 61 |
| N,O—dibenzoyl-N—methyl hydroxylamine | A | 230 | 36.3 | 2.36 | A | 230 | 40 | 75 |
| N,O—dibenzoyl-N—phenyl hydroxylamine | A | 230 | 3.2 | 0.97 | | | | |
| N,O—diacetyl-N—phenyl hydroxylamine | A | 230 | 9.4 | 2.28 | A | 230 | 10 | 81 |
| N,O—dilauroyl-N—methyl hydroxylamine | A | 230 | 45.3 | 2.54 | A | 230 | 50 | 81 |
| N—lauroyl-O—benzyoyl-N—ethyl hydroxylamine | A | 230 | 44.3 | 2.69 | A | 230 | 50 | 82 |
| N—carbethoxy-O—benzoyl-N—methyl hydroxylamine | A | 230 | 37.2 | 1.69 | A | 230 | 40 | 76 |
| N,O—dicarbethoxy-N—methyl hydroxylamine | A | 230 | — | 0.37 | A | 270 | 30 | 70 |
| N,N,O—triacetyl hydroxylamine | B | 220 | 27.8 | 1.67 | B | 220 | 30 | 75 |
| N,N,O—tribenzoyl hydroxylamine | A | 230 | 15.5 | 0.49 | | | | |
| N,O—dibenzoyl-N—carbethoxy-hydroxylamine | A | 230 | >110 | >2.19 | A | 270 | 30 | 77 |
| N—benzoyl-N,O—dicarbethoxy-hydroxylamine | A | 230 | 213 | 2.65 | | | | |
| N,N—dicarbethoxy-O—benzoyl hydroxylamine | A | 230 | >180 | >2.44 | A | 270 | 30 | 77 |
| N,N,O—tricarbethoxy hydroxylamine | A | 230 | >120 | >0.42 | A | 270 | 30 | 66 |
| control | A | 230 | — | 0 | A | 230 | 30 | 0 |

TABLE I-continued

| COMPOUND | Rheometer test | | | | Extraction test | | | |
| --- | --- | --- | --- | --- | --- | --- | --- | --- |
| | polymer type | temp. (°C.) | t$_{90}$ (min) | Δ torque (Nm) | polymer type | cure temp. (°C.) | cure time (min) | gel fraction (%) |
| control | B | 230 | — | 0 | B | 230 | 30 | 0 |

What is claimed is:

1. In a process for cross-linking a polymer selected from the group consisting of polyethylene and ethylene-propylene copolymers by contacting said polymer with a cross-linking agent at an elevated temperature, the improvement comprising using as the cross-linking agent a compound of the formula

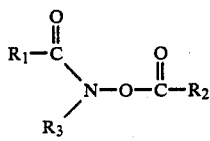

(I)

wherein $R_1$ and $R_2$ are independently selected from the group consisting of alkyl groups having 1-22 carbon atoms, alkenyl groups having 2-22 carbon atoms, cyclohexyl groups having 6-20 carbon atoms, phenyl groups having 6-20 carbon atoms, aralkyl groups having 7-20 carbon atoms, alkyloxy groups having 1-22 carbon atoms, alkenyloxy groups having 2-22 carbon atoms, and cyclohexyloxy groups having 6-20 carbon atoms, all of which groups may be substituted or unsubstituted; $R_3$ is selected from the group consisting of hydrogen, alkyl groups having 1-22 carbon atoms, alkenyl groups having 2-22 carbon atoms, cyclohexyl groups having 6-20 carbon atoms, phenyl groups having 6-20 carbon atoms, aralkyl groups having 7-20 carbon atoms, and

wherein $R_4$ is independently selected from the same group as $R_1$ and $R_2$ as defined above, all of which groups may be substituted or unsubstituted; provided that when $R_3$ is hydrogen, $R_1$ represents an alkyloxy, alkenyloxy or cyclohexyloxy group as defined above.

2. The process of claim 1 wherein the polymer is contacted with the cross-linking agent at a temperature from about 150° to about 300° C.

3. The process of claim 1 or 2 wherein $R_1$ is an alkoxy group having 1-22 carbon atoms, $R_2$ is an alkoxy group having 1-22 carbon atoms or a phenyl group, and $R_3$ is hydrogen.

4. The process of claim 1 or 2 wherein $R_1$ and $R_2$ are independently selected from the group consisting of alkyl groups having 1-22 carbon atoms, alkoxy groups having 1-22 carbon atoms, and phenyl, and $R_3$ is an alkyl group having 1-22 carbon atoms or phenyl.

5. The process of claim 1 or 2 wherein $R_1$ and $R_2$ are independently selected from the group consisting of alkyl groups having 1-22 carbon atoms, alkoxy groups having 1-22 carbon atoms, and phenyl, and $R_3$ is

wherein $R_1$ has the aforementioned meaning.

6. The process of claim 1 wherein the polymer is polyethylene.

7. The process of claim 3 wherein the polymer is polyethylene.

* * * * *